(12) United States Patent
Duncan et al.

(10) Patent No.: US 8,235,532 B2
(45) Date of Patent: Aug. 7, 2012

(54) COLOR SPLITTING METHOD FOR LIGHT SOURCES

(75) Inventors: Walter Marvin Duncan, Dallas, TX (US); Benjamin Lowell Lee, Duncanville, TX (US)

(73) Assignee: Texas Instruments Incorporated, Dallas, TX (US)

( * ) Notice: Subject to any disclaimer, the term of this patent is extended or adjusted under 35 U.S.C. 154(b) by 367 days.

(21) Appl. No.: 12/432,862

(22) Filed: Apr. 30, 2009

(65) Prior Publication Data

US 2010/0277697 A1    Nov. 4, 2010

(51) Int. Cl.
*G03B 21/26* (2006.01)
(52) U.S. Cl. ............................................. 353/34; 353/30
(58) Field of Classification Search .............. 353/30, 353/31, 68, 70, 44, 85; 345/62, 613, 694
See application file for complete search history.

(56) References Cited

U.S. PATENT DOCUMENTS 7,019,736 B2 *    3/2006    Allen et al. ................... 345/207

* cited by examiner

*Primary Examiner* — Que T Le
*Assistant Examiner* — Jerry Brooks
(74) *Attorney, Agent, or Firm* — Warren L. Franz; Wade J. Brady, III; Frederick J. Telecky, Jr.

(57) ABSTRACT

A system comprises two or more light sources comprising a first light source and a second light source, each light source of the two or more light sources configured to provide light of a particular wavelength, wherein a first wavelength of a first light provided by the first light source differs from a second wavelength of a second light provided by the second light source, and wherein the first light has a first radiant energy that experiences roll-off. The system further comprises a controller configured to modulate an attribute of each light source to compensate for the roll-off, the modulation comprising modulating an attribute of the first light source, and the modulation further comprising modulating an attribute of the second light source, the modulation of the second attribute being different from the modulation of the first attribute.

18 Claims, 2 Drawing Sheets

COLOR SPLITTING METHOD FOR LIGHT SOURCES

TECHNICAL FIELD

This disclosure relates in general to light modulation systems and more particularly to a method and system for optimizing luminous flux.

Overview

Spatial light modulators are devices that may be used in a variety of optical applications such as communications, display systems, military, biomedical and/or other systems applications. In some applications, spatial light modulators may generate an image or other light pattern by controlling a plurality of individual elements that control light to form the various light pattern or image. One example of a spatial light modulator is a digital micro-mirror device ("DMD").

With some spatial light modulators, certain light sources can produce different amounts of luminous flux to a plane of given area depending on the time duration for which the source is turned on.

SUMMARY OF EXAMPLE EMBODIMENTS

In accordance with one embodiment of the present disclosure, a system for modulating light comprises two or more light sources comprising a first light source and a second light source, each light source of the two or more light sources configured to provide light of a particular wavelength, wherein a first wavelength of a first light provided by the first light source differs from a second wavelength of a second light provided by the second light source, and wherein the first light has a first radiant energy that experiences roll-off. The system further comprises a controller configured to modulate an attribute of each light source to compensate for the roll-off, the modulation comprising modulating an attribute of the first light source, and the modulation further comprising modulating an attribute of the second light source, the modulation of the second attribute being different from the modulation of the first attribute.

In accordance with yet another embodiment, a method for modulating light comprises emitting light of a first wavelength and a second wavelength that differs from the first wavelength, the light of the first wavelength having a first radiant energy that experiences roll-off. The method also comprises modulating a frequency, period, or rate of pulses of the light of the first wavelength and the light of the second wavelength to compensate for the roll-off, the modulation comprising modulating pulses of the light of the first wavelength at a first frequency, period, or rate. The modulation further comprises modulating pulses of the light of the second wavelength at a second frequency period, or rate, the second frequency, period, or rate being different from the first frequency, period, or rate.

In accordance with yet another embodiment, a system for modulating light comprises two or more light sources comprising a first light source and a second light source, each light source of the two or more light sources configured to provide light of a particular wavelength or band of wavelengths, the first light source configured to provide light of a first wavelength or band of wavelengths that differs from a second wavelength or band of wavelengths of the light provided by the second light source. The system further comprises a controller configured to modulate a frequency, period, or rate of pulses of each light source in accordance with a radiant energy from the each light source over a time period, the modulation comprising modulating pulses of the first light source at a first frequency, period, or rate based at least in part on a first radiant energy of the first light source, and the modulation further comprising modulating pulses of the second light source at a second frequency, period, or rate based at least in part on a second radiant energy of the second light source, the second frequency, period, or rate different from the first frequency, period, or rate. The system may also comprise an integrator rod or may use other light elements such as holograms, grating, lens, etc., configured to combine and or homogenize the light from the two or more light sources. The system may also comprise acousto-optic or other spatial-temporal modulators to reflect, transmit, aggregate, steer, or deflect light sources prior to any image forming devices. The system further comprises a digital micromirror device configured to reflect the combined light, and a projection lens configured to project an image yielded by the combined light. The system may also comprise an acousto-optic or other spatial-temporal modulators after the spatial light modulator to reflect, transmit, aggregate, steer, or deflect light prior to image projection.

Numerous technical advantages are provided according to various embodiments of the present disclosure. Particular embodiments of the disclosure may exhibit none, some, or all of the following advantages depending on the implementation. In certain embodiments, improved electrical to optical efficiency may be achieved. In some embodiments, luminous energy flux of the system may be optimized. In some embodiments, lower average heating in the system may occur. In other embodiments a desired color point can be achieved.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

In a system utilizing a spatial light modulator and two or more light sources or light generators, the light sources or generators may produce different amounts of luminous flux, depending at least in part on the time duration for which the light source is turned on. These light sources or generators may operate in a color sequential mode, where one light source or generator is turned on, and when it is turned off another light source or generator is turned on. The time duration or the color cycle rate ("frequency" or "frame rate") of one or more light sources or light generators may be adjusted to optimize radiant energy flux, luminous energy flux, efficiency, and/or color point. Any attribute of the light source or light generator may be adjusted to optimize one or more of these variables. Some attributes that may be adjusted include frequency, period, rate, current, or voltage, or any other optical or electrical attribute.

Figure 1:
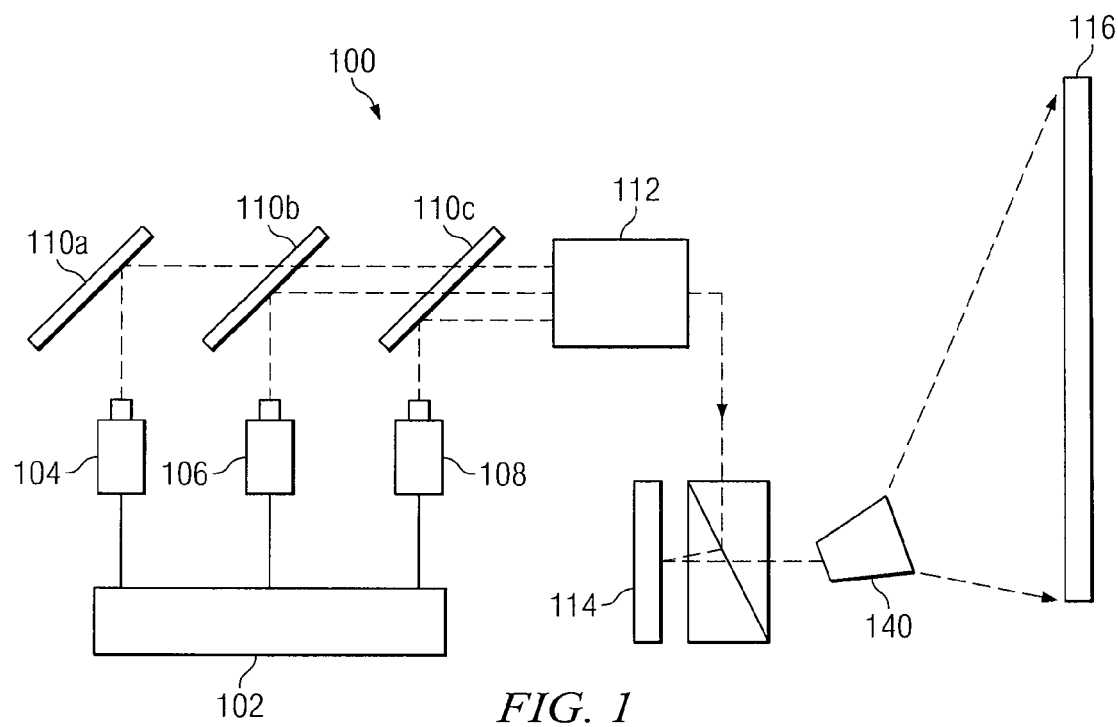
FIG. 1 illustrates one embodiment of a system for implementing a color splitting method for light sources or generators.

FIG. 1 illustrates one embodiment of a system 100 for implementing a color splitting method for light sources. In this example embodiment, system 100 comprises any suitable number of light sources 104, 106, and 108, controller 102, dichroic filters 110a, 110b, and 110c, integrator/spatial homogenizer 112, digital micromirror device (DMD) 114, projector 140, and display 116.

Light sources 104, 106, and 108 can be light emitting diodes (LEDs), lasers, or any other suitable light source or light generators that generate any suitable light, comprising any wavelength or band of wavelengths (the term "wavelength" in this disclosure may represent a single wavelength or a band of wavelengths). In some embodiments, light sources 104, 106, and 108 are red, green, and blue sources. In some embodiments, one or more light sources 104, 106, and 108 can produce non-visible light, such as infrared light. In certain embodiments, light from light sources 104, 106, and 108 can be passed through one or more dichroic filters 110 that selectively pass only certain wavelengths or band of wavelengths of light, while reflecting other wavelengths or band of wavelengths. Any suitable number of dichroic filters 110 may be used. In some embodiments, an integrator 112 or other spatial homogenizer can combine the light from the light sources and send the combined light to DMD 114 or other spatial light modulator. The micromirrors of DMD 114 or other pixel elements of a pixilated spatial light modulator reflect or transmit combined light through projector lens 140 towards display 116. Display 116 can comprise a front or rear projection screen, or any other technology suitable for displaying images.

In some embodiments, the system may also comprise acousto-optic or other spatial-temporal modulators to reflect, transmit, aggregate, steer, or deflect light sources prior to any image forming devices. The system may also comprise an acousto-optic or other spatial-temporal modulators after the spatial light modulator to reflect, transmit, aggregate, steer, or deflect light prior to image projection.

In some embodiments, controller 102 is operable to control the cycling of the light sources 104, 106, and 108. Light sources 104, 106, and 108 may be turned on and off in various combinations to produce an image on display 116. At some times, only one of the light sources 104, 106, and 108 may be producing light. At other times, two or more of the light sources 104, 106, and 108 may be producing light. In some embodiments of the present disclosure, the duty cycle and/or frequency, period, duration, or rate of light production by the light sources 104, 106, and 108 may be adjusted to produce a desired optical power output.

In other embodiments, controller 102 is operable to adjust one or more electrical drive conditions of the light sources 104, 106, and 108. Controller 102 may, for example, modulate current to one or more of the light sources 104, 106, and 108 to over drive or under drive the light source. The current modulation may be based at least in part on the radiant energy available from the sources 104, 106, and 108 over a color frame time. Current modulation can increase or decrease the radiant energy from the light sources 104, 106, and 108 to optimize or improve optical power output. In other embodiments, controller 102 and/or another component may work together and adjust a combination of current, duty cycle, pulse duration, frequency, period, and/or rate to produce a desired optical power output or other desired properties.

In a display system utilizing a spatial light modulator, each pixel of light on a display is a combination of different colors (e.g., red, green, or blue). To display an image, the spatial light modulator relies on the viewer's eyes to blend the different colored lights into the desired colors of the image. For example, an element of the spatial light modulator responsible for creating a purple pixel will only reflect the red and blue light to the surface. The pixel itself is a rapidly alternating flash of the blue and red light. A viewer's eyes will blend these flashes in order to see the intended hue of the projected image. Light sources can be cycled to produce different colors at different times depending on the requirements of the image.

Different colors of light produced by light sources 104, 106, and 108 may produce different amounts of optical power due to the physical properties of the light and/or the light source 104, 106, and 108. Optical power (also known as radiant power) is the radiant energy flux in time. For some light sources, certain colors may not produce radiant energy or radiant power uniformly in time. As one example, some light sources that produce red light may not produce radiant energy uniformly in time. That is, red light from a light source may "roll over" or "roll off" in time, and may not produce as much radiant energy as light from another light source.

Figure 2A:
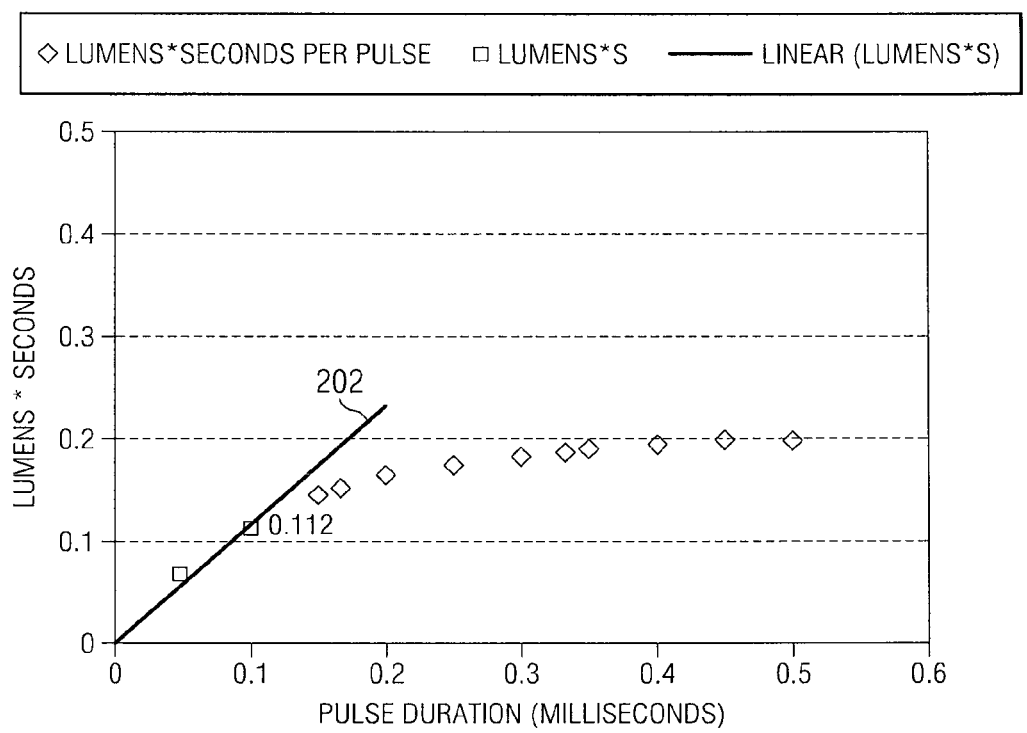
FIGS. 2A and 2B are graphs illustrating the luminous energy of a red and a blue light emitting diode.
Figure 2B:
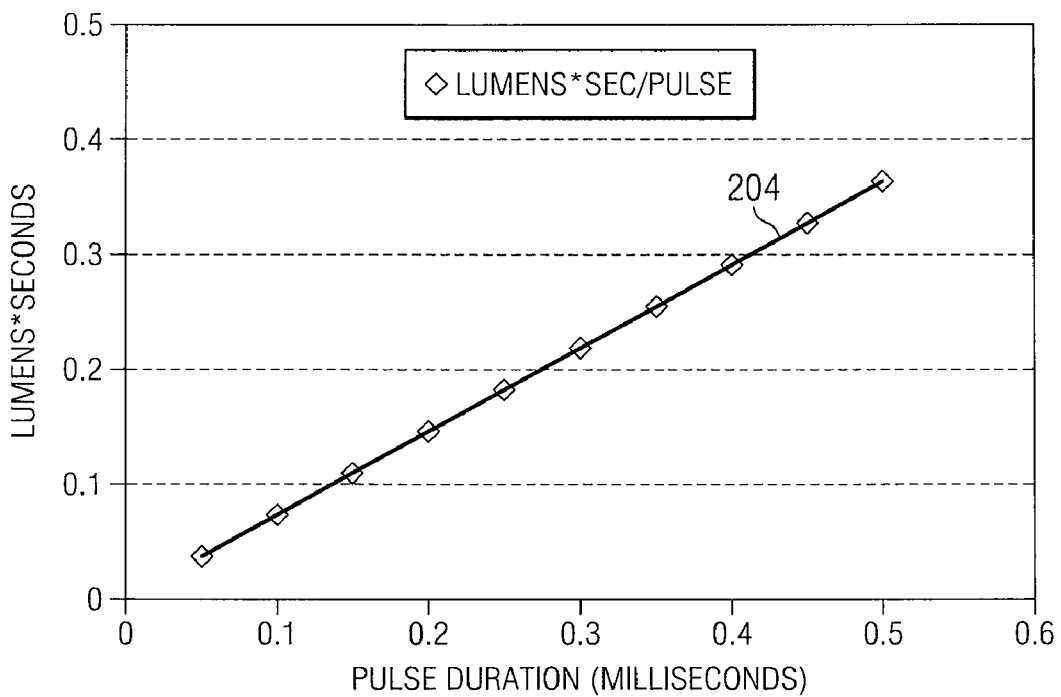

FIGS. 2A and 2B illustrate an example of this phenomenon. FIG. 2A illustrates a number of data points that show a relationship between luminous flux and time for a red light emitting diode. In FIGS. 2A and 2B, the x-axes of the graphs depict time in milliseconds. The y-axes of the graphs depict lumens multiplied by seconds per pulse. Lumens are the unit for luminous flux, a measure of the perceived power of light. Luminous flux differs from radiant flux, the measure of the total power of light emitted, in that luminous flux is adjusted to represent the varying sensitivity of the human eye to different wavelengths of light. As seen in the graph for a red light source, FIG. 2A, the luminous energy increases almost linearly (along line 202) for the first 0.1 milliseconds gate duration, and then the luminous energy begins to level off from 0.1 to 0.5 milliseconds, reaching a maximum of about 0.2 lumens times seconds per pulse. This response over time is known as "roll-off," because the luminous energy levels off instead of following its initial trajectory. The roll-off of a red light source may lead to less than optimal radiant energy output and/or color performance Another response can be seen in FIG. 2B, which illustrates a number of data points that show a relationship between luminous flux and time for a blue light emitting diode. The y-axis of the graph depicts lumens multiplied by seconds per pulse, and the x-axis depicts time in milliseconds. In this graph, the luminous energy increases approximately linearly along line 204, reaching about 0.36 lumens times seconds per pulse at 0.5 milliseconds gate duration. The blue light from the light source does not exhibit the roll-off that occurred with the red light. In some embodiments, a green light emitting diode may behave similarly to the blue light emitting diode shown in FIG. 2B.

In certain embodiments, a system uses different turn-on rates for one color relative to another in order to optimize light production. That is, each color (or combination of colors) has its own turn-on rate that may differ from the turn-on rate of another color or combination of colors. In some embodiments, the rates may be changed to maximize the radiant production of the light sources 104, 106, and 108. In some existing systems, the red, green, and blue light sources may all be given the same frequency, period, or rate, so that each time the individual light sources are turned on they are illuminated for a specific amount of time and then turned off, and another light source is then turned on. The light sources may alternate between on and off states to produce a desired color for displaying an image. The length of time that the light sources are turned on (the pulse duration) may be the same for each of the light sources, and the individual light sources may be turned on at the same frequency, period, or rate.

In contrast, in one embodiment of the present disclosure, the frequency, period, rate, and/or the duration of one light source may be different from that of another light source. Changing the frequency, period, rate, and/or duration of a light source can help optimize the radiant production of the light sources as a whole. A light source, such as a red light source, that produces less radiant power than another light source may be illuminated with a greater frequency, period, or rate and a shorter duration than that of the other light sources, such as blue or green light sources. This may help address the roll-off issues that can affect red light sources (as shown in FIGS. 2A and 2B). By pulsing on the red light sources at a greater frequency, period, or rate than the blue and green light sources, the total light production of the red light source can be increased over a given time period relative to the light production of the blue and green light sources. This can improve performance of the system, such as by producing brighter colors or a higher picture quality.

In some embodiments, the frequency, period, rate, and/or duration of one or more light sources may be adjusted to set a color point. A desired color point may be achieved by increasing or decreasing the frequency, period, or rate of one or more of the light sources. For example, a red light source may be given a higher frequency than another light source. A color point may also be achieved in some embodiments by adjusting the duration of the light pulses of one or more light source. For example, a blue light source may be given a color period longer than one or more of the other light sources to produce a desired color point.

In certain embodiments, adjusting the frequency, period, or rate of one or more light sources may improve electrical to optical efficiency. As seen in FIG. 2A, the luminous energy of the red light emitting diode rolls off although the diode is still turned on. Power is being consumed during the roll-off period but the luminous energy output is not increasing, as it is for a blue light emitting diode. By increasing the frequency, period, or rate and decreasing the duration of the red light source, more efficient electrical to optical ratios may be obtained.

Some embodiments may produce more optical power from one or more of the light sources. As an example, a red light source may be pulsed with a frequency or rate twice that of another light source and with a period one-half that of the other light source. This red light source may produce a greater optical power output than a red light source with a longer period and shorter frequency or rate that experiences a roll-off of its optical power output while it is emitting light. By avoiding all or part of the roll-off period, more optical power may be produced.

Another advantage of some embodiments is lower average heating for the system. Reducing the duty cycle or pulse duration of one or more of the light sources may reduce heat generated by the light source.

In certain embodiments, one or more light sources may produce non-visible light. The frequency or rate and time period of non-visible light sources may be adjusted just as it is with visible light sources in some of the example embodiments. Frequency or rate and time periods for non-visible light sources may be adjusted to optimize optical power or for any other suitable purpose. Non-visible light sources may be used, for example, to produce infrared signals that can be monitored by appropriate monitoring equipment for a variety of purposes.

Figure 3A:
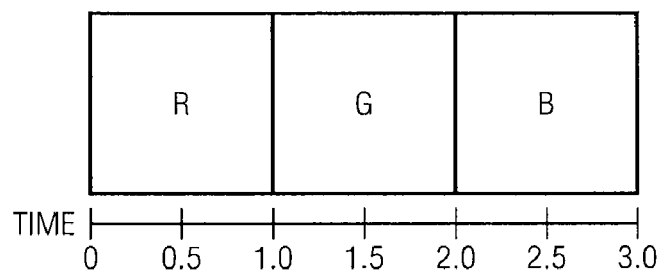
FIGS. 3A and 3B illustrate sequence examples with and without red pulse modulation.
Figure 3B:
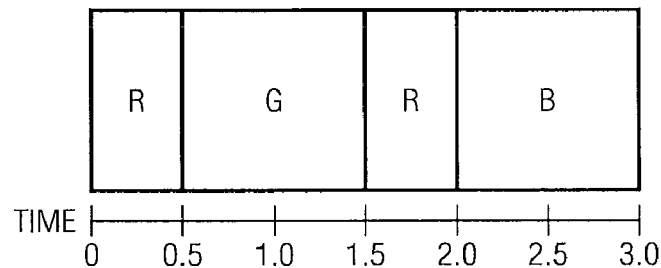

FIGS. 3A and 3B illustrate sequence examples with and without red pulse modulation. The time lines shown in FIGS. 3A and 3B comprise arbitrary time units (milliseconds in this example) and are not necessarily drawn to scale. In other embodiments, different or additional colors or light sources may be used. Also in other embodiments, different sequencing patterns may be used and still fall within the scope of this disclosure.

FIG. 3A illustrates a sequence example where red, green, and blue (labeled "R," "G," and "B") light sources are sequenced with approximately the same frequency or rate and duration. The light sources are sequenced rapidly one at a time and the eye of the observer combines the light to see the image. Here, the red light source will turn on at time 0.0 ms and the red light output may roll off before the time at 1.0 ms is reached, thereby not producing a consistent output of luminous energy. The red light source may produce light similar to the output shown in FIG. 2A.

In FIG. 3A at time 1.0 ms, the red light source may turn off and a green light source may turn on. The green light source stays on for the time between 1.0 and 2.0 ms, and the green light source may produce a steady output of luminous energy, similar to the luminous energy output of the blue light source shown in FIG. 2B. At time 2.0 ms, the green light source may turn off and the blue light source may turn on. Again referencing FIG. 3A, the blue light source stays on for the time between 2.0 and 3.0 ms, and may produce luminous energy similar to the green light source, as shown in FIG. 2B. When the blue light source turns off, the sequence may continue again with the red light source. As discussed above, one disadvantage to this sequence example is that the red light source produces less total luminous energy output than the green and blue light sources.

FIG. 3B illustrates a sequence where one or more of the red, green, and blue light sources are turned on with frequencies and time durations that are different from another of the light sources. In this example, the red light source is given a frequency or rate twice that of the blue and green light sources and duration one-half that of the blue and green light sources. A sequencing example such as this can increase the luminous energy output of the red light source over the entire sequence to help alleviate, at least in part, the roll-off phenomenon associated with some light sources that produce red light.

Again referencing FIG. 3B, at time 0.0 ms, the red light source is turned on. At time 0.5 ms, the red light source is turned off and the green light source is turned on. Because the red light source was not turned on for a full time duration as it was in FIG. 3A, the light source may not stay on long enough to roll-off, so the average luminous energy output over a number of short time pulses can be greater than a single long pulse. The green light source is on from time 0.5 to time 1.5 ms, and at time 1.5 ms the red light source turns on again. The red light source is on from time 1.5 to 2.0 ms, at which point the red light source turns off and the blue light source turns on. The red light source produces a luminous energy output during its second duration that is similar to the output during its first duration. The red light avoids a large portion of the roll-off period because of its shorter duration. The combined luminous energy output of red light during the entire sequence is greater in this example than the luminous energy output of red light in a sequence as described in FIG. 3A. The blue light source turns off at 3.0 ms, and the sequence begins again.

In FIG. 3B, over the example time period of 3.0 ms, the red, green, and blue light sources are each on for a total of 1.0 ms, but the red light source has twice the frequency or rate of the blue and green light sources. A sequencing structure such as this may help reduce the effect of the roll-off period of the red light source. The total luminous energy output of the red light source during the sequence can be increased without increasing the ratio of the time that the red light source is on compared to the other light sources. Because the light sources are sequencing rapidly, a viewer of an image does not notice that the light sources have different frequencies since the human eye blends the light together.

Any suitable ratio of the on time of one light source to the on time of another light source may be used. In the example of FIG. 3B, the red, green, and blue light sources are each on for approximately one-third of the time and off for two-thirds of the time. In other examples, the red light source may be on for one-half the time, and the green and blue light sources are each on for approximately one-fourth of the time. In some embodiments, the on time for some light sources may overlap.

Any suitable ratio of the frequencies and/or periods of the light sources may be used. Each color may be given its own frequency, rate, and/or period, or some colors may share frequencies, rates, and/or periods. In the example of FIG. 3B, the red light source has a frequency or rate that is twice that of the blue and green light sources and a period that is one-half that of the blue and green light sources. The blue and green light sources in that example may have similar frequencies and periods. Another light source, such as a yellow light source, may have a frequency, rate, and/or period similar to that of the red light source, similar to that of the blue and green light sources, or different from that of the other light sources.

Any suitable ratio of the frequency or rate of one light source to the frequency or rate of another light source may be used. In the example of FIG. 3B, the red light source has a frequency that is twice that of the green and blue light sources. In other examples, the frequency or rate of the red light source can be three times that of the blue and green light sources.

Any ratio or ratios of the frequency, rate, or period between any two or more light sources may also change over time. As one example, a red light source may comprise a frequency twice that of a green light source at one point in time in a system, and at another point in time the frequency of the red light source may change to three times that of the green light source. In addition, the ratios may change based upon any formula or mathematical algorithm.

As discussed above, in some embodiments controller 102 may modulate current to one or more of the light sources to over drive or under drive the light source. In other words, the magnitude of the drive current may be increased or decreased. As one example, a red light source may be an LED that receives more drive current than a blue and/or green light source. The additional current supplied to the LED can create a greater optical power output from the red light source. This greater power output may help compensate, at least in part, for the roll-off phenomenon that can occur with some red light sources. As another example, drive current may be lowered for one or more light sources. This can be done so that two or more of the light sources can produce approximately equivalent optical power output. For example, blue and green light sources in an embodiment may receive less drive current than a red light source. Any combination of under drive or over drive may be performed on any group of light sources to produce a desired optical power output. A system with a large number of light sources may under drive or over drive one or more of the sources a specific amount in order to maximize light production.

In some embodiments, other factors may also be considered in determining how to drive the one or more light sources, such as heat dissipation, power usage, color point, and/or image quality. As one example, a light source that produces greater heat than one or more other light sources may receive less drive current than the other light sources. The light source that receives less drive current may produce less heat, lowering the overall heat produced by the system. As another example, light sources that use more power may receive lower drive currents to reduce their power usage and in turn reduce the total power consumed by the system.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system for modulating light, comprising:
   first and second sources of respective different color wavelength light pulses, each source characterized by an approximately linear relationship of lumens per second vs. pulse duration for an initial pulse duration, with the first source pulse characterized by a roll-off following a pulse duration of given time period during which the second source pulse maintains the linear relationship;
   a spatial light modulator positioned for receiving light from the first and second light sources and having individually controllable image pixel forming elements for modulating the received light in order to form an image; and
   a controller for controlling on and off pulsing of the first and second light sources in synchronization with control of the modulation of the received light by the image pixel forming elements so that the first and second sources are sequentially pulsed for a color sequencing eye integration time cycle, with the first source being pulsed with pulses of duration less than the given time period and the second source being pulsed with pulses of duration at least some of which are greater than the given time period, and with the sum of the time durations of all pulses of the first and second sources illuminating the spatial light modulator during the eye integration time being approximately the same.

2. The system of claim 1, wherein the first and second sources are light emitting diodes.

3. The system of claim 2, wherein the spatial light modulator is a digital micro-mirror device.

4. The system of claim 3, wherein the first source is a source of red light pulses, and the second source is a source of green or blue light pulses.

5. The system of claim 4, wherein the green or blue light source is pulsed with pulses of twice the duration of pulses with which the red light source is pulsed.

6. The system of claim 1, wherein the first and second sources are lasers.

7. The system of claim 1, wherein the spatial light modulator is a digital micro-mirror device.

8. The system of claim 1, wherein the first source is a source of red light pulses, and the second source is a source of green or blue light pulses.

9. The system of claim 8, wherein the green and blue light source are each pulsed with pulses of twice the duration of pulses with which the red light source is pulsed.

10. The system of claim 1,
    further comprising a third source of respective different color wavelength light pulses, the third source characterized by an approximately linear relationship of lumens per second vs. pulse duration for the initial pulse duration, with the third source pulse characterized by an approximately linear relationship of lumens per second vs. pulse duration for an initial pulse duration, and with the linear relationship maintained at the given time period;

wherein the spatial light modulator is further positioned for receiving light from the third light source; and wherein the controller further control on and off pulsing of the third light source so that the firs, second and third sources are sequentially pulsed for the color sequencing eye integration time cycle, with the third source being pulsed with pulses of duration at least some of which are greater than the given time period, and with the sum of the time durations of all pulses of the first, second and third sources illuminating the spatial light modulator during the eye integration time being approximately the same.

11. The system of claim 10, wherein the first, second and third sources are light emitting diodes.

12. The system of claim 11, wherein the spatial light modulator is a digital micro-mirror device.

13. The system of claim 12, wherein the first source is a source of red light pulses, the second source is a source of green light pulses, and the third source is a source of blue light pulses.

14. The system of claim 13, wherein the green and blue light sources are each pulsed with pulses of twice the duration of pulses with which the red light source is pulsed.

15. The system of claim 10, wherein the first, second and third sources are lasers.

16. The system of claim 10, wherein the spatial light modulator is a digital micro-mirror device.

17. The system of claim 10, wherein the first source is a source of red light pulses, the second source is a source of green light pulses, and the third source is a source of blue light pulses.

18. The system of claim 17, wherein the green and blue light sources are each pulsed with pulses of twice the duration of pulses with which the red light source is pulsed.

* * * * *